US008610701B2

(12) United States Patent
Komiya

(10) Patent No.: US 8,610,701 B2
(45) Date of Patent: Dec. 17, 2013

(54) ORGANIC LIGHT EMITTING DISPLAY DEVICE WITH PIXEL CONFIGURED TO BE DRIVEN DURING FRAME PERIOD AND DRIVING METHOD THEREOF

(75) Inventor: Naoaki Komiya, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 147 days.

(21) Appl. No.: 12/976,940

(22) Filed: Dec. 22, 2010

(65) Prior Publication Data

US 2011/0292015 A1 Dec. 1, 2011

(30) Foreign Application Priority Data

Jun. 1, 2010 (KR) ........................ 10-2010-0051679

(51) Int. Cl.
*G06F 3/038* (2013.01)
*G09G 5/00* (2006.01)

(52) U.S. Cl.
USPC ............................................ 345/211; 345/76

(58) Field of Classification Search
USPC .................................................. 345/76, 211
See application file for complete search history.

(56) References Cited

U.S. PATENT DOCUMENTS

2004/0070557 A1* 4/2004 Asano et al. .................... 345/76
2007/0035487 A1* 2/2007 Ryu et al. ........................ 345/76
2008/0030435 A1* 2/2008 Kim ................................ 345/76
2008/0309653 A1* 12/2008 Takahashi et al. ............ 345/211
2009/0051628 A1* 2/2009 Kwon ............................ 345/77
2009/0135107 A1* 5/2009 Kim ................................ 345/76
2009/0243979 A1* 10/2009 Kim ................................ 345/76
2010/0149153 A1* 6/2010 Yamamoto et al. ........... 345/211

FOREIGN PATENT DOCUMENTS

KR 10-2007-0066491 6/2007
KR 10-2008-0095799 10/2008
KR 10-0907391 7/2009
KR 10-2009-0104664 10/2009

OTHER PUBLICATIONS

KIPO Office action dated May 24, 2012 for Korean priority Patent application No. 10-2010-0051679, (1 page).

* cited by examiner

*Primary Examiner* — Kwang-Su Yang
(74) *Attorney, Agent, or Firm* — Christie, Parker & Hale, LLP

(57) ABSTRACT

A pixel operating in a concurrent (or simultaneous) emission method includes: an organic light emitting diode; a second transistor for controlling an amount of current flowing to a second power supply through the organic light emitting diode from a first power supply, the first power supply being coupled to a first electrode of the second transistor; a first transistor coupled between a data line and a gate electrode of the second transistor; a first capacitor coupled between a second electrode of the first transistor and the first power supply; and a fourth transistor coupled between a second electrode of the second transistor and the organic light emitting diode, wherein the first transistor and the fourth transistor are configured to be turned on during a period when the first capacitor is charged with a voltage corresponding to a data signal.

12 Claims, 5 Drawing Sheets

ORGANIC LIGHT EMITTING DISPLAY DEVICE WITH PIXEL CONFIGURED TO BE DRIVEN DURING FRAME PERIOD AND DRIVING METHOD THEREOF

CROSS-REFERENCE TO RELATED APPLICATION

This application claims priority to and the benefit of Korean Patent Application No. 10-2010-0051679, filed on Jun. 1, 2010 in the Korean Intellectual Property Office, the entire content of which is incorporated herein by reference.

BACKGROUND

1. Field

Aspects of embodiments of the present invention relate to an organic light emitting display device including pixels and a driving method thereof, particularly an organic light emitting display device including pixels driven using a concurrent (or simultaneous) emission method, and a method of driving the organic light emitting display device.

2. Description of Related Art

Recently, a variety of flat panel displays that reduce the disadvantages of cathode ray tubes, such as weight and volume, have been developed. Typical flat panel displays include liquid crystal displays, field emission displays, plasma display panels, organic light emitting display devices, etc.

An organic light emitting display device is a flat display device that displays an image using organic light emitting diodes that emit light by recombination of electrons and holes and has a high response speed and low power consumption.

In general, the organic light emitting display devices are classified into passive matrix organic light emitting display devices (PMOLED) or active matrix organic light emitting display devices (AMOLED), in accordance with the methods of driving the organic light emitting diodes.

An active matrix organic light emitting display device includes a plurality of scan lines, a plurality of data lines, a plurality of power source lines, and a plurality of pixels coupled with the lines and arranged in a matrix. The pixel includes an organic light emitting diode, a driving transistor for controlling the amount of current supplied to the organic light emitting diode, a switching transistor for transmitting a data signal to the driving transistor, and a storage capacitor for maintaining a voltage of the data signal.

The active matrix organic light emitting display device has a relatively low power consumption, but may have a display that is not uniform because the magnitude of a current flowing through an organic light emitting element may vary due to variations in a voltage difference between the gate and the drain (or the gate and the source) of a driving transistor that drives the organic light emitting element, that is, a threshold voltage (or a threshold voltage difference) of the driving transistor.

That is, properties of the transistors disposed in the pixels are changed by variables in the manufacturing process, and accordingly, the threshold voltages of the driving transistors vary between the pixels. Therefore, a compensating circuit that can compensate the threshold voltage of the driving transistors may be additionally formed to remove the non-uniformity between the pixels.

The compensating circuit, however, additionally includes a plurality of transistors and capacitors, and signal lines controlling these transistors. Therefore, the pixel including the compensating circuit has a problem in that the aperture ratio decreases and the possibility of defect increases.

SUMMARY

An aspect of an embodiment of the present invention is directed toward a pixel including two transistors and two capacitors.

An aspect of an embodiment of the present invention is directed toward an organic light emitting display device including pixels that can reduce non-uniformities of driving transistors while driving the pixels in a concurrent (or simultaneous) emission method, and a method of driving the organic light emitting display device.

According to one embodiment of the present invention, a pixel includes: an organic light emitting diode; a second transistor for controlling an amount of current flowing to a second power supply through the organic light emitting diode from a first power supply, the first power supply being coupled to a first electrode of the second transistor; a first transistor coupled between a data line and a gate electrode of the second transistor; a first capacitor coupled between a second electrode of the first transistor and the first power supply; and a fourth transistor coupled between a second electrode of the second transistor and the organic light emitting diode, wherein the first transistor and the fourth transistor are configured to be turned on during a period when the first capacitor is charged with a voltage corresponding to a data signal.

The pixel may further include a second capacitor coupled between the second electrode of the first transistor and the gate electrode of the second transistor. The pixel may further include a third transistor coupled between the gate electrode of the second transistor and the second electrode of the second transistor and may be configured to be turned on during a period when the second capacitor is charged with a voltage corresponding to a threshold voltage of the second transistor.

According to another embodiment of the present invention, an organic light emitting display device is configured to be driven during one frame period which is divided into a reset period, a threshold voltage compensation period, a scan period, and an emission period. In this embodiment, the organic light emitting display device includes: a pixel unit including a plurality of pixels coupled with a plurality of first scan lines, a plurality of second scan lines, and a plurality of data lines; a control line coupled to all of the pixels; a control line driver for supplying a control signal to the control line; a scan driver for supplying a plurality of first scan signals to the first scan lines and a plurality of second scan signals to the second scan lines; and a data driver for supplying a plurality of data signals to the data lines, wherein the reset period, the threshold voltage compensation period, and the scan period are non-emission periods, and the pixels are configured to be charged with voltages corresponding to the data signals during the scan period and to supply currents corresponding to the voltages to a plurality of organic light emitting diodes of the pixels.

Each of the pixels disposed along an i-th (i is a natural number) horizontal line may include: an organic light emitting diode of the organic light emitting diodes; a second transistor for controlling an amount of current flowing to a second power supply through the organic light emitting diode from a first power supply, the first power supply being coupled to a first electrode of the second transistor; a first transistor coupled between a data line of the data lines and a gate electrode of the second transistor and configured to be turned on when a first scan signal of the first scan signals is supplied to an i-th first scan line of the first scan lines; a first capacitor coupled between a second electrode of the first transistor and the first power supply; and a fourth transistor coupled between a second electrode of the second transistor and the organic light emitting diode and configured to be turned on when a second scan signal is supplied to an i-th second scan line of the second scan lines. The scan driver may be configured to sequentially supply the first scan signals to the first scan lines and to sequentially supply the second scan signals to the second scan lines during the scan period.

The scan driver may be configured to supply a second scan signal of the second scan signals to the i-th second scan line in synchronization with the first scan signal supplied to the i-th first scan line during the scan period. The scan driver may be configured to concurrently supply the second scan signals to the second scan lines during the emission period. The pixel may further include a second capacitor coupled between the second electrode of the first transistor and the gate electrode of the second transistor. The organic light emitting display device may further include a third transistor coupled between the gate electrode of the second transistor and the second electrode of the second transistor and may be configured to be turned on when a control signal is supplied to the control line. The control line driver may be configured to supply the control signal during a second period of the reset period and during the threshold voltage compensation period. The scan driver may be configured to supply the first scan signals and the second scan signals to the first scan lines and the second scan lines, respectively, during a second period of the reset period and during the threshold voltage compensation period. The organic light emitting display device may further include a second power driver for supplying a power of the second power supply, wherein the second power driver is configured to supply a high-level second power during a portion of a first period of the reset period and during the second period of the reset period and the threshold voltage compensation period and is configured to supply a low-level second power during the scan period and the emission period.

The scan driver may be configured to supply the first scan signals to the first scan lines during a second period of the reset period and during the threshold voltage compensation period and may be configured to supply the second scan signals to the second scan lines during the second period of the reset period. The second power supply may be set to supply a voltage at a low-level during the one frame period. The organic light emitting display device may further include a first power driver for supplying a power of a first power supply of the first power driver, wherein the first power driver may be configured to supply a low-level first power during the reset period and to supply a high-level first power during the threshold voltage compensation period, the scan period, and the emission period.

According to one embodiment of the present invention, a method of driving an organic light emitting display device includes: initializing, during a reset period, gate electrode voltages of driving transistors included in a plurality of pixels arranged in a plurality of horizontal lines; charging, during a threshold voltage compensation period, the pixels with voltages corresponding to the threshold voltages of the driving transistors; charging, during a scan period, the pixels at voltages corresponding to data signals while selecting the pixels for each horizontal line of the horizontal lines sequentially; and producing, during an emission period, light in the pixels in accordance with the data signals, wherein, during the emission period, a current corresponding to a data signal of the data signals flows to an organic light emitting diode of a corresponding pixel of the pixels, where the corresponding pixel is charged with a voltage corresponding to the data signal.

The pixels may be set to a non-emission state during the reset period and the threshold voltage compensation period. During the scan period, the pixels of an i-th horizontal line of the horizontal lines may be set to a non-emission state when an i-th second scan signal of the second scan signals is not supplied to an i-th scan line of the second scan lines.

According to an embodiment of the present invention, an organic light emitting display device including a plurality of pixels and a method of driving the organic light emitting display device, it is possible to stably display a 3D image and simplify the structure of the pixels, using a concurrent (or simultaneous) emission method. Further, according to embodiments of the present invention, in a concurrent (or simultaneous) emission method, current flows to the organic light emitting diode from the driving transistor during a period when a data signal is supplied to the pixels, and accordingly it is possible to reduce or minimize non-uniformities of the driving transistors.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
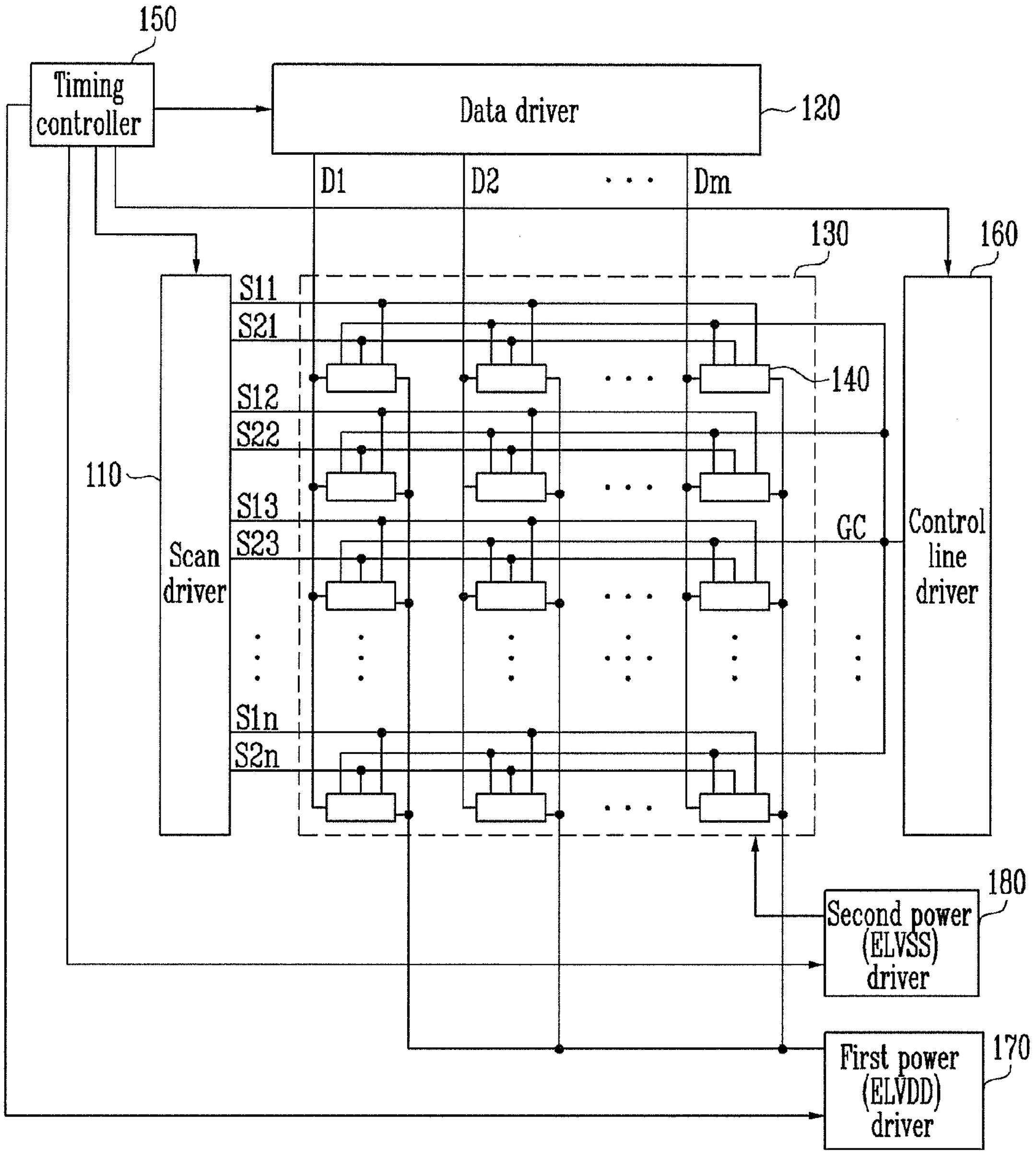
FIG. 1 is a block diagram illustrating an organic light emitting display device according to an embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to the complete understanding of the invention are omitted for clarity. Also, like reference numerals refer to like elements throughout.

Exemplary embodiments for those skilled in the art to easily implement the present invention are described in detail with reference to FIGS. 1 to 7.

FIG. 1 is a block diagram illustrating an organic light emitting display device according to an embodiment of the present invention.

Referring to FIG. 1, an organic light emitting display device according to an embodiment of the present invention includes: a pixel unit (or display unit) 130 including a plurality of pixels coupled with first scan lines S11 to S1*n*, second scan lines S21 to S2*n*, a control line GC, and data lines D1 to Dm; a scan driver 110 for supplying first scan signals to the first scan lines S11 to S1*n* and second scan signals to the second scan lines S21 to S2*n*; a control line driver 160 for supplying a control signal to the control line GC; a data driver 120 for supplying a data signal to the data lines D1 to Dm; and a timing control unit 150 for controlling the scan driver 110, the data driver 120, and the control line driver 160.

Further, the organic light emitting display device according to an embodiment of the present invention includes a first power driver 170 for supplying a power of a first power supply ELVDD to the pixels 140 and a second power driver 180 for supplying a power of a second power supply ELVSS to the pixels 140.

The scan driver 110 supplies first scan signals to the first scan signal lines S11 to S1*n* and second scan signals to the second scan lines S21 to S2*n*. The scan driver 110 concurrently (or simultaneously) supplies the first scan signals to the first scan lines S11 to S1*n* during a second period of a reset period of one frame period and a threshold voltage compensation period of the one frame period, and sequentially supplies the first scan signals to the first scan lines S11 to S1*n* during a scan period of the one frame period.

Further, the scan driver 110 concurrently (or simultaneously) supplies the second scan signals to the second scan lines S21 to S2*n* during the second period of the reset period of the one frame period and the threshold voltage compensation period of the one frame period, and sequentially supplies the second scan signals to the second scan lines S21 to S2*n* during the scan period of the one frame period. In this configuration, the second scan signal supplied to the i-th (i is a natural number) second scan line S2*i* during the scan period is synchronized with the first scan signal supplied to the i-th scan line S1*i*. Further, the scan driver 110 concurrently (or simultaneously) supplies the second scan signals to the second scan lines S21 to S2*n* during an emission period of the one frame period.

The first scan signal and the second scan signal are set at a voltage that allows a transistor included in the pixel 140 to be turned on. That is, a transistor supplied with the first scan signal (or the second scan signal) during a specific period of one frame period is turned on during the period when the first scan signal (or the second scan signal) is supplied.

The data driver 120 supplies data signals to the data lines D1 to Dm to be synchronized with the first scan signals sequentially supplied to the first scan lines S11 to S1*n* during the scan period.

The control line driver 160 supplies a control signal to the control line GC during the second period of the reset period and the threshold voltage compensation period (which may be referred to as "Vth"). The control signal is set with a voltage that allows the transistor included in the pixel 140 to be turned on.

The pixel unit 130 has the pixels 140 located at crossing regions of the first scan lines S11 to S1*n*, the second scan lines S21 to S2*n*, and the data lines D1 to Dm. The pixels 140 are supplied with power from the first power supply ELVDD and the second power supply ELVSS. The pixels 140 control the amount of current supplied to the second power supply ELVSS through the organic light emitting diodes from the first power supply ELVDD in accordance with the data signals during the emission period of one frame period. Accordingly, light having a luminance (e.g., a predetermined luminance) corresponding to the data signal is generated in the organic light emitting diode.

The first power driver 170 supplies a power of the first power supply ELVDD to the pixels 140. The first power driver 170 supplies a low-level power (or a low voltage level power) of the first power supply ELVDD during the reset period of one frame period, and supplies a high-level power (or a high voltage level power) of the first power supply ELVDD during the threshold voltage compensation period, the scan period, and the emission period.

The second power driver 180 supplies a power of the second power supply ELVSS to the pixels 140. The second power generating unit 180 supplies a high-level power (or a high voltage level power) of the second power supply ELVSS during a portion (e.g., a set portion) of the reset period and the threshold voltage compensation period and supplies a low-level power of the second power supply ELVSS during the scan period and the emission period.

The voltage of the high-level power of the second power supply ELVSS may be set at a voltage level at which current cannot flow to the organic light emitting diode. For example, the voltage of the high-level power may be set the same as the voltage of the high-level power of the first power supply ELVDD. Further, the low-level voltage of the second power supply ELVSS may be set at a level at which current can flow to the organic light emitting diode.

Figure 2:
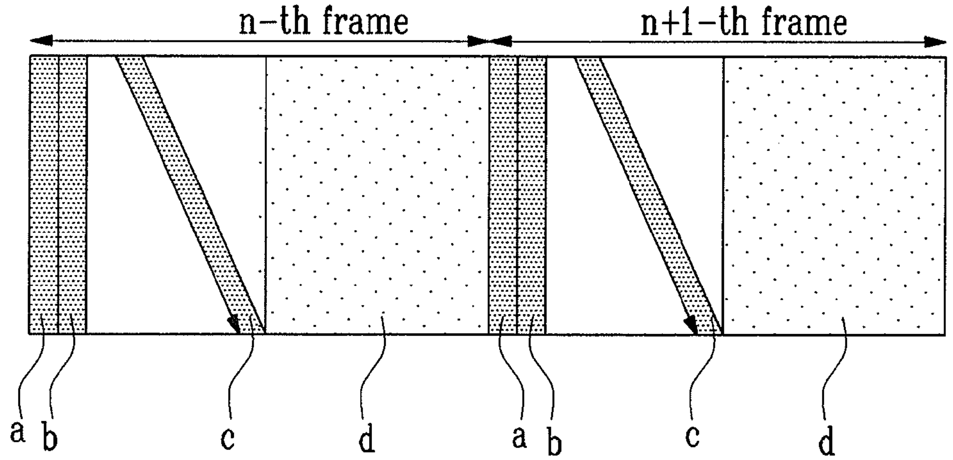
FIG. 2 is a diagram illustrating the operation in a concurrent (or simultaneous) emission method according to an embodiment of the present invention.

FIG. 2 is a diagram illustrating a method of driving an organic light emitting display device according to an embodiment of the present invention.

Referring to FIG. 2, the organic light emitting display device according to an embodiment of the present invention operates in a concurrent (or simultaneous) emission method. In general, driving methods are classified in to a progressive emission method or a concurrent (or simultaneous) emission method. The progressive emission method includes sequentially (or progressively) supplying data to each horizontal line of pixels and sequentially emitting light by using pixels of each horizontal line in the same order that the data was supplied.

The concurrent (or simultaneous) emission method includes sequentially (or progressively) supplying data to each horizontal line of pixels and concurrently (or simultaneously) emitting light by using pixels after the data is supplied to all of the pixels. According to one embodiment of the present invention, one frame driven in the concurrent (or simultaneous) emission method is divided into a reset period (a), a threshold voltage compensation period (which may be referred to as "Vth") (b), a scan period (c), and an emission period (d). In one embodiment, the pixels 140 are sequentially driven for each scan line during the scan period (c), and all the pixels 140 are concurrently (or simultaneously) driven during the reset period (a), the threshold voltage compensation period (b), and the emission period (d).

The reset period (a) is a period in which the voltages of the gate electrodes of the transistors in the pixels 140 are initialized. In other words, the gate electrode of each of the driving transistors is set at a voltage smaller (or lower) than the voltage of the high-level power of the first power supply ELVDD during the reset period.

The threshold voltage compensation period (b) is a period in which the threshold voltages of the driving transistors are compensated for. The pixels 140 are charged with voltages corresponding to the threshold voltages of the corresponding driving transistors during the threshold voltage compensation period.

The scan period (c) is a period in which data signals are supplied to the pixels 140. The pixels 140 are charged with voltages corresponding to the data signals supplied during the scan period.

The emission period (d) is a period in which the pixels 140 emit light in accordance with the data signals supplied during the scan period.

As described above, according to the driving method of one embodiment of the present invention, it is possible to reduce the number of transistors in compensation circuits in the pixels 140 and the number of signal lines because the operational periods (a) to (d) are clearly separated in terms of time. Further, it is easy to implement a three-dimensional (3D) display using a pair of shutter spectacles because the operational periods (a) to (d) are clearly separated in terms of time.

A 3D display using a pair of shutter spectacles alternately outputs left-eye and right-eye images for each frame. A user wears "shutter spectacles", of which the left-eye and right-eye transmittances switch in the range of 0% to 100%. The shutter spectacles alternately supply the left-eye image and the right-eye image to the left eye and the right eye, respectively, such that the user recognizes a stereoscopic image.

Figure 3:
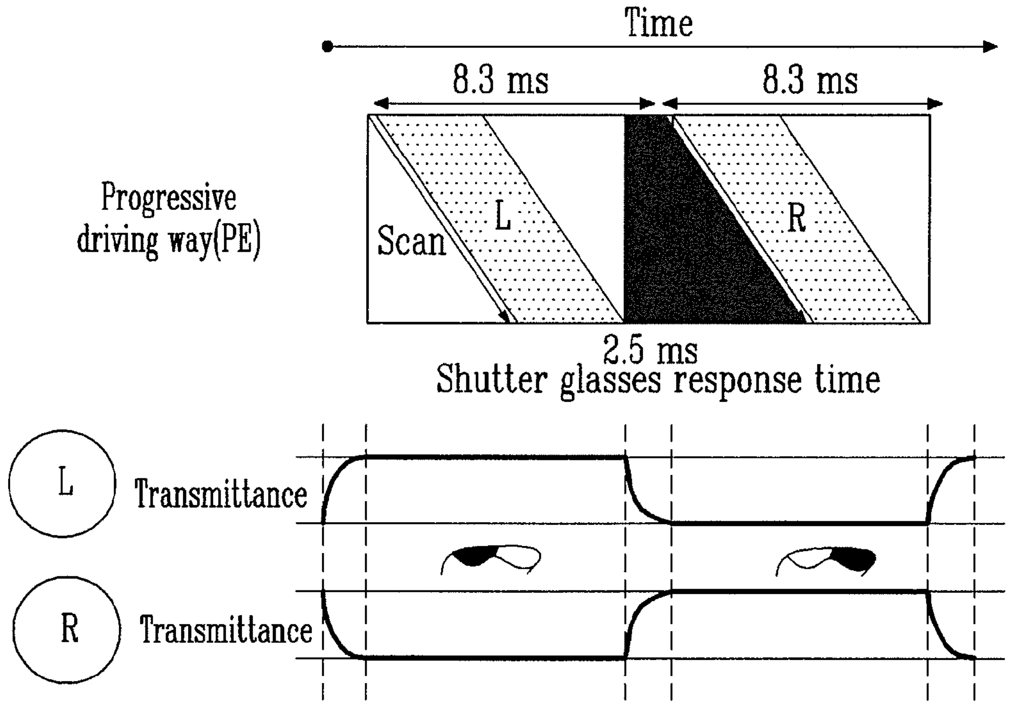
FIG. 3 is a diagram illustrating an operation of a three-dimensional (3D) display using a pair of shutter spectacles according to a progressive emission method.

FIG. 3 is a diagram illustrating an operation of a three-dimensional (3D) display using a pair of shutter spectacles in a progressive emission method.

Referring to FIG. 3, emission should be stopped for the response time of the shutter spectacles (e.g., 2.5 ms) in order to reduce or prevent cross talk between the left-eye/right-eye images when a screen is outputted by the progressive emission method. That is, a non-emission period is additionally provided for at least the response time of the shutter spectacles between the frame (an ith-frame, where i is a natural number) outputting the left-eye image and the frame (an i+1th-frame) outputting the right-eye image. However, this decreases the emission duty ratio.

Figure 4:
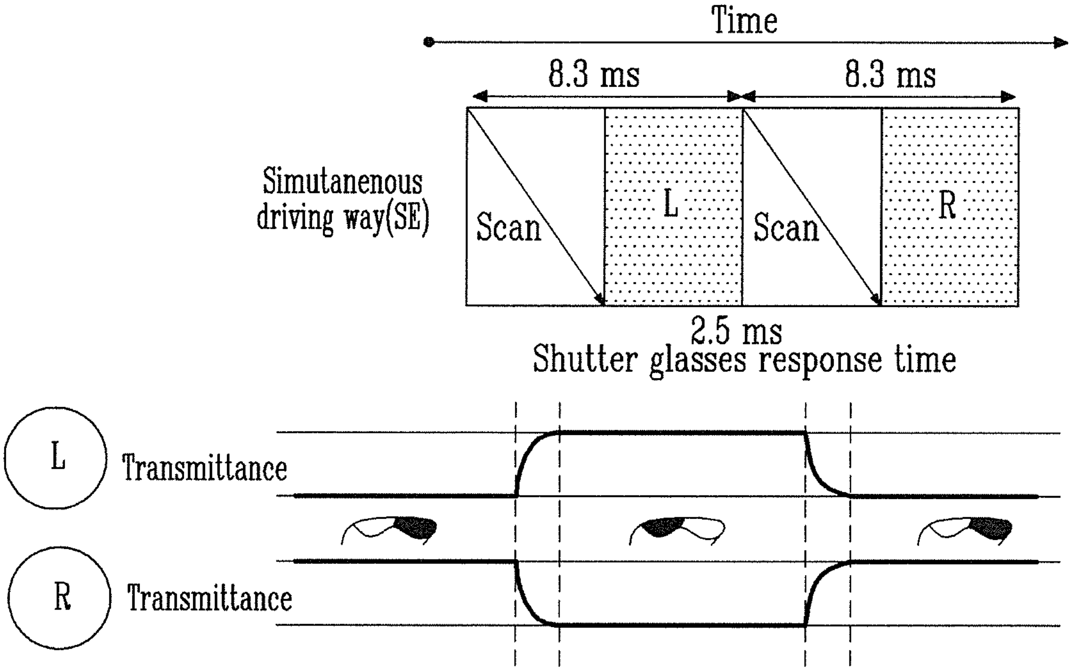
FIG. 4 is a diagram illustrating an operation of a 3D display using a pair of shutter spectacles according to a concurrent (or simultaneous) emission method according to an embodiment of the present invention.

FIG. 4 is a diagram illustrating an operation of a 3D display using a pair of shutter spectacles according to a concurrent (or simultaneous) emission method according to an embodiment of the present invention.

Referring to FIG. 4, in one embodiment, light is concurrently (or simultaneously) emitted from the entire pixel unit, and the pixels are set to a non-emission state in periods other than the emission period when an image is displayed using the concurrent (or simultaneous) emission method. Therefore, a non-emission period can be located between the left-eye image output period and the right-eye image output period.

That is, the pixels 140 are set to the non-emission state during the reset period, the threshold voltage compensation period, and the scan period between the i-frame and the i+1-frame, and (unlike the progressive emission method) it does not need to specifically reduce the emission duty ratio because the above periods can be synchronized with the response time of the shutter spectacles.

Figure 5:
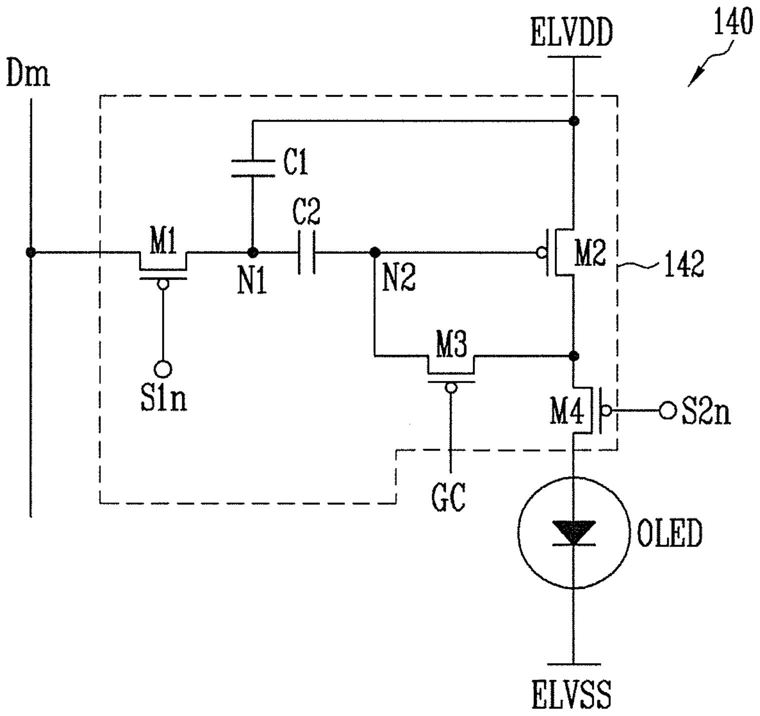
FIG. 5 is a diagram illustrating an embodiment of a pixel shown in FIG. 1.

FIG. 5 is a diagram illustrating an embodiment of a pixel shown in FIG. 1. A pixel coupled with the n-th first scan line S1*n*, the n-th second scan line S2*n*, and the m-th data line Dm is shown in FIG. 5, for convenience of description.

Referring to FIG. 5, the pixel 140 according to the first embodiment of the present invention includes an organic light emitting diode and a pixel circuit 142 for controlling the amount of current supplied to the organic light emitting diode.

The anode electrode of the organic light emitting diode is coupled to the pixel circuit 142, and the cathode electrode is coupled to the second power supply ELVSS. The organic light emitting diode produces light with a luminance (e.g., a predetermined luminance) in accordance with the current supplied from the pixel circuit 142.

The pixel circuit 142 is charged with a voltage corresponding to the data signal and the threshold voltage of the driving transistor, and controls the amount of current supplied to the organic light emitting diode on the basis of the charged voltage. For this operation, the pixel circuit 140 includes four transistors M1 to M4 and two capacitors C1 and C2.

A gate electrode of the first transistor M1 is coupled to the first scan line S1*n*, and a first electrode is coupled to the data line Dm. Further, a second electrode of the first transistor M1 is coupled to a first node N1. The first transistor M1 is turned on and electrically connects the data line Dm with the first node N1 when the first scan signal is supplied to the first scan line S1*n*.

A gate electrode of the second transistor M2 (which may be referred to as a "driving transistor") is coupled to a second node N2, and a first electrode is coupled to the first power supply ELVDD. Further, a second electrode of the second transistor M2 is coupled to the anode electrode of the organic light emitting diode through the fourth transistor M4. The second transistor M2 controls the amount of current supplied to the organic light emitting diode in accordance with the voltage applied to the second node N2.

A first electrode of the third transistor M3 is coupled to the second electrode of the second transistor M2, and a second electrode of the third transistor M3 is coupled to second node N2. Further, the gate electrode of the third transistor M3 is coupled to the control line GC. The third transistor M3 is turned on and diode-connects the second transistor M2 when a scan signal is supplied to the control line GC.

A first electrode of the fourth transistor M4 is coupled to the second electrode of the second transistor M2, and a second electrode is coupled to the anode electrode of the organic light emitting diode. Further, a gate electrode of the fourth transistor M4 is coupled to the second scan line S2*n*. The fourth transistor M4 is turned on and electrically connects the second transistor M2 with the organic light emitting diode when a scan signal is supplied to the second scan line S2*n*.

The first capacitor C1 is coupled between the first node N1 and the first power supply ELVDD. The first capacitor C1 is charged with a voltage corresponding to the data signal.

The second capacitor C2 is coupled between the first node N1 and the second node N2. The second capacitor C2 is charged with a voltage corresponding to the threshold voltage of the second transistor M2.

Figure 6:
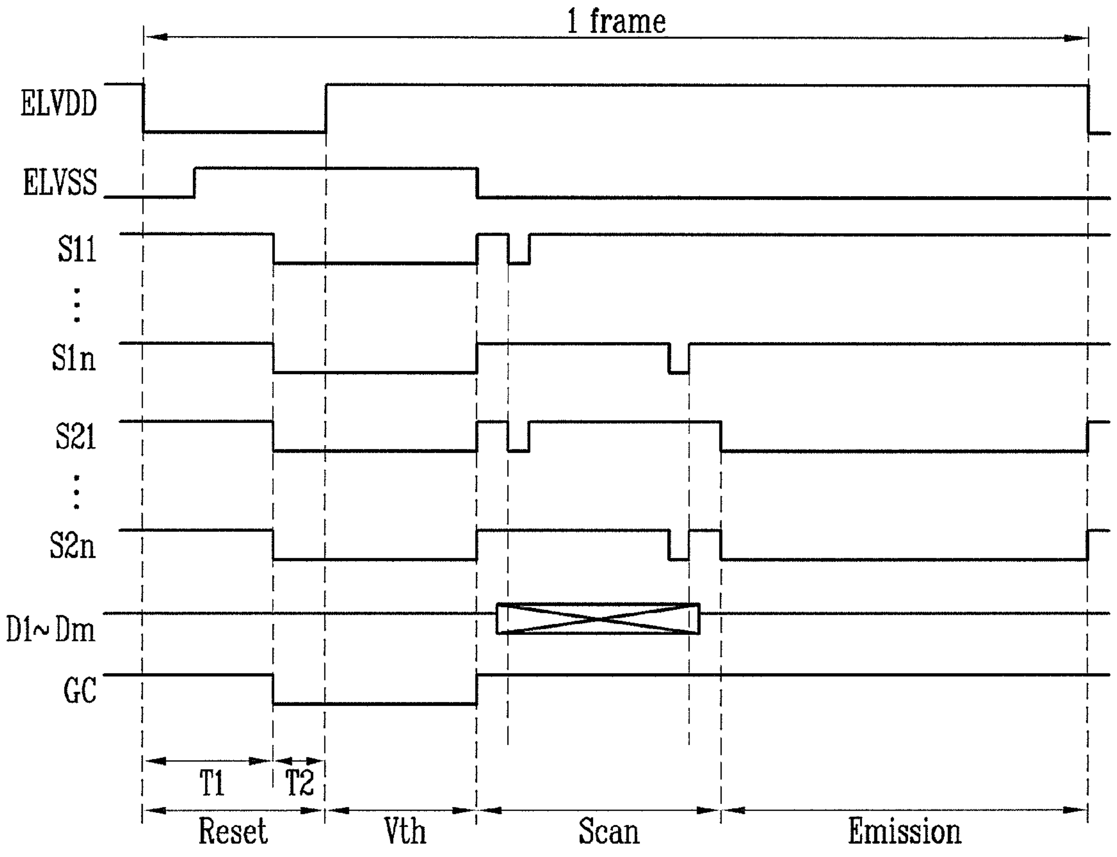
FIG. 6 is a diagram illustrating a method of driving the pixel shown in FIG. 5 according to one embodiment of the present invention.

FIG. 6 is a diagram illustrating a method of driving the pixel shown in FIG. 5 according to one embodiment of the present invention.

Referring to FIG. 6, the first power supply ELVDD is set at a low level during the reset period. Further, the second power supply ELVSS is set at a high level during a portion (e.g., a set portion) of the first period T1 of the reset period and the second period T2 of the reset period, and the threshold voltage compensation period.

When the first power supply ELVDD is set to the low level (or low voltage level) during the first period T1 of the reset period, the pixels 140 are set to a non-emission state. Further, the voltage of the second power supply ELVSS is set at a high level during a portion of the first period T1 of the reset period.

First scan signals are supplied to the first scan lines S11 to S1*n*, second scan signals are supplied to the second scan lines S21 to S2*n*, and a control signal is supplied to the control line GC, during the second period T2 of the reset period.

When the first scan signals are supplied to the first scan lines S11 to S1n, the first transistor M1 is turned on. When the first transistor M1 is turned on, an initialization voltage supplied to the data line Dm during the first period is supplied to the first node N1. In this configuration, the initialization voltage may be set the same as any one voltage of a plurality of data signals. For example, the initialization voltage may be set to the lowest voltage of the data signals. When the initialization voltage is supplied to the first node N1, the voltage of the second node N2 decreases with the voltage drop of the first node N1.

When the second scan signals are supplied to the second scan lines S21 to S2n, the fourth transistor M4 is turned on. The anode electrode of the organic light emitting diode and the second transistor M2 are electrically coupled when the fourth transistor M4 is turned on. In this operation, the second transistor M2 is turned on, and accordingly, reverse current flows from the anode electrode of the organic light emitting diode to the first power supply ELVDD supplying a low-level power having a low voltage level. In this case, the voltage of the anode electrode of the organic light emitting diode drops below the voltage of the first power supply ELVDD.

When the control signal is supplied to the control line GC, the third transistor M3 is turned on. When the third transistor M3 is turned on, the second node N2 and the anode electrode of the organic light emitting diode are electrically coupled. In this process, the voltage of the second node N2 decreases to the voltage of the anode electrode of the organic light emitting diode.

That is, the voltage of the second node N2 decreases during the second period T2 of the reset period. In this configuration, the voltage of the second node N2 is set to a level that allows the second transistor M2 to be turned on during the next threshold voltage compensation period, for example, set lower than the voltage obtained by subtracting the threshold voltage of the second transistor M2 from the voltage of the high-level power of the first power supply ELVDD.

The voltage of the first power supply ELVDD increases to a high level during the threshold voltage compensation period. In this process, the second transistor M2 is diode-connected and is turned on because the voltage of the second node N2 is initialized to a low level. When the second transistor M2 is turned on, the voltage of the second node N2 increases up to a level obtained by subtracting the absolute value of the threshold voltage of the second transistor M2 from the voltage of the high-level power (or high voltage level power) of the first power supply ELVDD. The second transistor M2 is turned off after the voltage of the second node N2 rises to the level obtained by subtracting the absolute value of the threshold voltage of the second transistor M2 from the voltage of high-level power of the first power supply ELVDD.

A reference voltage is supplied to the data line Dm during the threshold voltage compensation period such that the reference voltage is supplied to the first node N1. The reference voltage may be set the same as the voltage of the data signal of any one of a plurality of data lines (or data signals). In this configuration, the second capacitor C2 is charged with a voltage between the first node N1 and the second node N2, that is, a voltage corresponding to the threshold voltage of the second transistor M2. In other words, the reference voltage supplied to the first node N1 is set at the same level in all of the pixels 140, but the voltage supplied to the second node N2 is set differently for each of the pixels 140 in accordance with the threshold voltages of the second transistors M2. Therefore, the voltage of the charged second capacitor C2 depends on the threshold voltage of the second transistor M2 such that it is possible to compensate for a threshold voltage (or a threshold voltage difference) of the second transistor M2.

During the scan period, the first scan signals are sequentially supplied to the first scan lines S11 to S1n, and the second scan signals are sequentially supplied to the second scan lines S21 to S2n. Further, the supply of a control signal to the control line GC is stopped during the scan period and data signals are supplied to the data lines in synchronization with the first scan signals.

The third transistor M3 is turned off when the supply of the control signal to the control line GC is stopped. When the first scan signal is supplied to the n-th first scan line S1n, the first transistor M1 is turned on. A data signal from the data line Dm is supplied to the first node N1 when the first transistor M1 is turned on. In this process, the first capacitor C1 is charged with a voltage (e.g., a set voltage) in accordance with the data signal. The second node N2 is set to a floating state during the scan period such that the charged second capacitor C2 maintains the level provided (or set) in the previous period, regardless of voltage changes of the first node N1.

When the second scan signal is supplied to the n-th second scan line S2n, the fourth transistor M4 is turned on. When the fourth transistor M4 is turned on, a current (e.g., predetermined current) is supplied from the second transistor M2 to the organic light emitting diode in accordance with the data signal supplied to the first node N1.

Thereafter, the supply of first and second scan signals to the n-th first scan line S1n and the n-th second scan line S2n is stopped and, the first transistor M1 and the fourth transistor M4 are turned off before the emission period.

In the present invention described above, a specific pixel is controlled to supply current to the organic light emitting diode when the pixel is supplied with a data signal during the scan period, and the pixel is controlled not to supply current to the organic light emitting diode before the emission period after the pixel is charged with a voltage corresponding to the data signal.

That is, one embodiment of the present invention charges the gate electrode of the second transistor M2 in the pixel 140 with a voltage corresponding to the data signal while concurrently (or simultaneously) turning on and off the first and fourth transistors M1 and M4 during the scan period. In this configuration, since the fourth transistor M4 is turned on when the data signal is supplied, the second transistor M2 supplies a current to the organic light emitting diode during the period when the data signal is supplied.

Experimentally, configuring the second transistor M2 to supply current from the second transistor M2 to the organic light emitting diode (during the period when the data signal is supplied) reduces the amount of stress on the second transistor M2 in comparison to not supplying current to the organic light emitting diode. Therefore, according to an embodiment of the present invention, current is supplied to the organic light emitting diode through the second transistor M2 by concurrently (or simultaneously) turning on the first transistor M1 and the fourth transistor M4 in each of the pixels when the data signal is supplied in the scan period such that it is possible to reduce or compensate for non-uniformities of the second transistors M2 in the pixel unit 130.

Second scan signals are supplied to the second scan lines S21 to S2n during the emission period. When the second scan signals are supplied to the second scan lines S21 to S2n, the fourth transistors M4 in the pixels 140 are turned on. The second transistor M2 and the organic light emitting diode are electrically coupled when the fourth transistor M4 is turned on. In this case, the second transistor M2 controls the amount of current flowing to the organic light emitting diode, in accordance with the voltage of the charged in the first and second capacitors C1 and C2. Therefore, an image with luminance (e.g., a predetermined luminance) corresponding to the data signals is displayed in the pixel unit 130 during the emission period.

Figure 7:
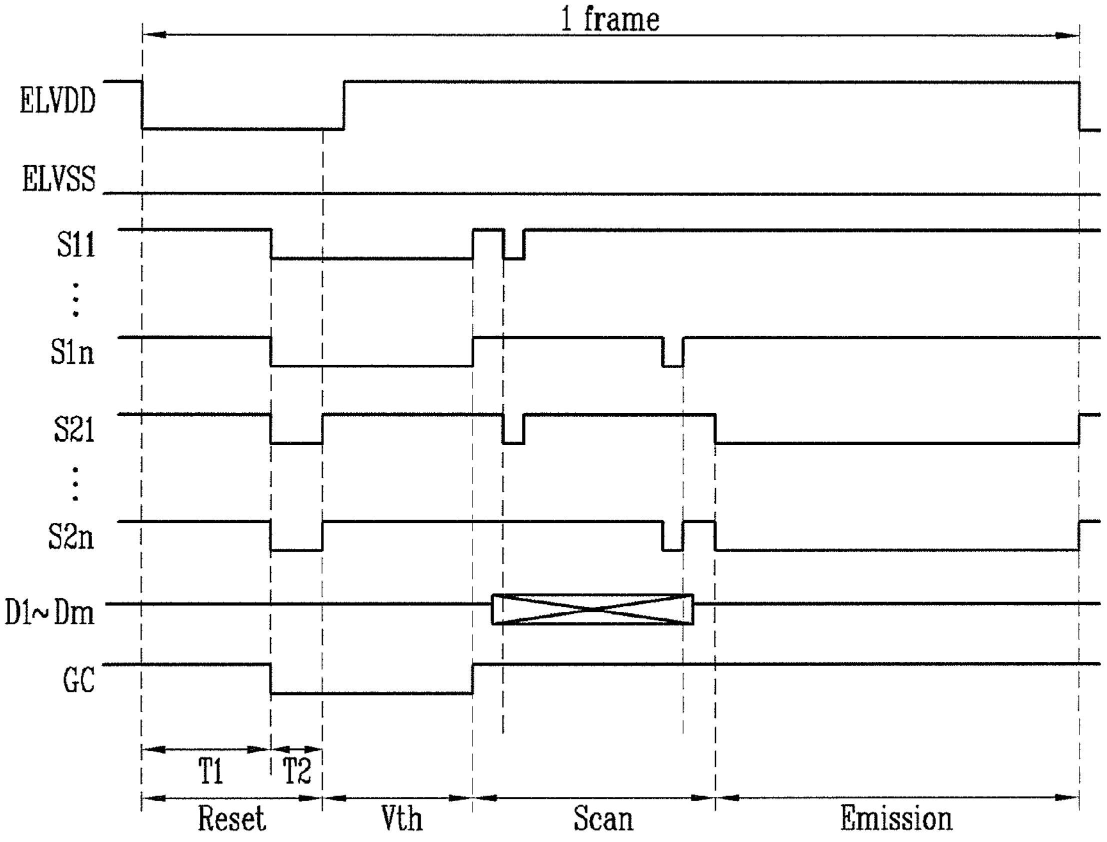
FIG. 7 is a diagram illustrating a method of driving the pixel shown in FIG. 5 according to one embodiment of the present invention.

FIG. 7 is a diagram illustrating a method of driving the pixel shown in FIG. 5 according to one embodiment of the present invention. The driving waveform shown in FIG. 7 is the same as the driving waveform shown in FIG. 6, except for the driving waveform of the second power supply ELVSS and the second scan lines S21 to S2*n* during the reset period and the threshold voltage compensation period. In other words, in FIG. 7, the voltage of second power supply ELVSS is set at a low level during one frame period, and the second scan lines S21 to S2*n* are not supplied with a second scan signal during the threshold voltage compensation period.

Referring to FIG. 7, the first power supply ELVDD is set at a low level (e.g., a low voltage level) during the reset period. When the first power supply ELVDD is set at the low level during the first period T1 of the reset period, the pixels 140 are set to a non-emission state.

First scan signals are supplied to the first scan lines S11 to S1*n*, second scan signals are supplied to the second scan lines S21 to S2*n*, and a control signal is supplied to the control line GC during the second period T2 of the reset period.

When the first scan signals are supplied to the first scan lines S11 to S1*n*, the first transistor M1 is turned on. When the first transistor M1 is turned on, a reference voltage is supplied to the data line Dm. When the control signal is supplied to the control line GC, the third transistor M3 is turned on. When the third transistor M3 is turned on, the second node N2 and the anode electrode of the organic light emitting diode are electrically coupled.

When the second scan signals are supplied to the second scan lines S21 to S2*n*, the fourth transistor is turned on. The anode electrode of the organic light emitting diode and the second transistor M2 are electrically coupled when the fourth transistor M4 is turned on. In this process, the second node N2 is electrically coupled with the second power supply ELVSS through the organic light emitting diode, such that the voltage of the second node N2 substantially drops to the voltage of the second power supply ELVSS (e.g., the voltage of the second node N2 drops to a voltage corresponding to the sum of the threshold voltage of the organic light emitting diode and the voltage of the second power supply ELVSS).

The supply of second scan signals to the second scan lines S21 to S2*n* is stopped during the threshold voltage compensation period. Further, the voltage of the first power supply ELVDD rises at a high level, after the supply of second scan signals to the second scan lines are stopped. When the supply of second scan signals to the second scan lines S21 to S2*n* is stopped, the fourth transistor M4 is turned off. Because the voltage of the second node N2 was initialized to a low level, the second transistor M2, which is diode-connected, is turned on such that the voltage of the second node N2 rises up to the voltage obtained by subtracting the absolute value of the threshold voltage of the second transistor M2 from the voltage of the high-level power of the first power supply ELVDD.

A reference voltage is supplied to the data line Dm during the threshold voltage compensation period, such that the reference voltage is supplied to the first node N1. In this configuration, the second capacitor C2 is charged with a voltage (or a voltage difference) between the first node N1 and the second node N2, that is, a voltage corresponding to the threshold voltage of the second transistor M2.

Thereafter, the first scan signals are sequentially supplied to the first scan lines S11 to S1*n*, and the second scan signals are sequentially supplied to the second scan lines S21 to S2*n*. Further, the supply of a control signal to the control line GC is stopped during the scan period, and data signals are supplied to the data lines in synchronization with the first scan signals.

The third transistor M3 is turned off when the supply of a control signal to the control line GC is stopped. When the first scan signal is supplied to the n-th first scan line S1*n*, the first transistor is turned on. A data signal from the data line Dm is supplied to the first node N1 when the first transistor M1 is turned on. In this process, the first capacitor C1 is charged with a voltage (e.g., a set voltage) in accordance with the data signal. Meanwhile, the second node N2 is set to a floating state during the scan period, such that the charged second capacitor C2 maintains the level provided in the previous period, regardless of voltage changes of the first node N1.

When the second scan signal is supplied to the n-th second scan line S2*n*, the fourth transistor M4 is turned on. When the fourth transistor M4 is turned on, a current (e.g., a predetermined current) is supplied from the second transistor M2 to the organic light emitting diode in accordance with the data signal supplied to the first node N1. Thereafter, when the supply of first and second scan signals to the n-th first scan line S1*n* and the n-th second scan line S2*n* is stopped, the first transistor M1 and the fourth transistor M4 are turned off before the emission period.

Second scan signals are supplied to the second scan lines S21 to S2*n* during the emission period. When the second scan signals are supplied to the second scan lines S21 to S2*n*, the fourth transistors M4 in the pixels 140 are turned on. The second transistor M2 and the organic light emitting diode are electrically coupled when the fourth transistor M4 is turned on. In this case, the second transistor M2 controls the amount of current flowing to the organic light emitting diode, in accordance with the voltage charged in the first and second capacitors C1 and C2. Therefore, an image with a luminance (e.g., a predetermined luminance) corresponding to the data signals is displayed in the pixel unit 130 during the emission period.

Embodiments of the present invention include a method of driving a pixel in which the first transistor M1 and the fourth transistor M4 are concurrently (or simultaneously) turned on and off during the scan period in the concurrent (or simultaneous) driving method. The reset period and the threshold voltage compensation period may be driven using waveforms, for example, as disclosed in Korean Patent Application No. 2009-0071280, which is incorporated herein by reference in its entirety.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device configured to be driven during one frame period which is divided into a reset period, a threshold voltage compensation period, a scan period, and an emission period, the organic light emitting display device comprising:

a pixel unit comprising a plurality of pixels coupled to a plurality of first scan lines, a plurality of second scan lines, and a plurality of data lines;

a control line coupled to all of the pixels;

a control line driver for supplying a control signal to the control line;

a scan driver for supplying a plurality of first scan signals to the first scan lines and a plurality of second scan signals to the second scan lines; and a data driver for supplying a plurality of data signals to the data lines, wherein the reset period, the threshold voltage compensation period, and the scan period are non-emission periods, and the pixels are configured to be charged with voltages corresponding to the data signals during the scan period and to supply currents corresponding to the voltages to a plurality of organic light emitting diodes of the pixels, wherein each of the pixels along an i-th (i is a natural number) horizontal line comprises:

an organic light emitting diode of the organic light emitting diodes;

a first transistor for controlling an amount of current flowing to a second power supply through the organic light emitting diode from a first power supply, the first power supply being coupled to a first electrode of the first transistor;

a second transistor coupled between a data line of the data lines and a gate electrode of the first transistor and configured to be turned on when a first scan signal of the first scan signals is supplied to an i-th first scan line of the first scan lines;

a first capacitor coupled between a second electrode of the second transistor and the first power supply; and a third transistor coupled between a second electrode of the first transistor and the organic light emitting diode and configured to be turned on when a second scan signal is supplied to an i-th second scan line of the second scan lines.

2. The organic light emitting display device as claimed in claim 1, wherein the scan driver is configured to sequentially supply the first scan signals to the first scan lines and to sequentially supply the second scan signals to the second scan lines during the scan period.

3. The organic light emitting display device as claimed in claim 1, wherein the scan driver is configured to supply a second scan signal of the second scan signals to the i-th second scan line in synchronization with the first scan signal supplied to the i-th first scan line during the scan period.

4. The organic light emitting display device as claimed in claim 1, wherein the scan driver is configured to concurrently supply the second scan signals to the second scan lines during the emission period.

5. The organic light emitting display device as claimed in claim 1, wherein each of the pixels further comprises a second capacitor coupled between the second electrode of the second transistor and the gate electrode of the first transistor.

6. The organic light emitting display device as claimed in claim 1, wherein each of the pixels further comprises a fourth transistor coupled between the gate electrode of the first transistor and the second electrode of the first transistor and configured to be turned on when a control signal is supplied to the control line.

7. The organic light emitting display device as claimed in claim 6, wherein the control line driver is configured to supply the control signal during a second period of the reset period and during the threshold voltage compensation period.

8. The organic light emitting display device as claimed in claim 1, wherein the scan driver is configured to supply the first scan signals and the second scan signals to the first scan lines and the second scan lines, respectively, during a second period of the reset period and during the threshold voltage compensation period.

9. The organic light emitting display device as claimed in claim 8, further comprising a second power driver for supplying a power of the second power supply, wherein the second power driver is configured to supply a high-level second power during a portion of a first period of the reset period and during the second period of the reset period and the threshold voltage compensation period and is configured to supply a low-level second power during the scan period and the emission period.

10. The organic light emitting display device as claimed in claim 1, wherein the scan driver is configured to supply the first scan signals to the first scan lines during a second period of the reset period and during the threshold voltage compensation period and is configured to supply the second scan signals to the second scan lines during the second period of the reset period.

11. The organic light emitting display device as claimed in claim 10, wherein the second power supply is set to supply a voltage at a low level during the one frame period.

12. The organic light emitting display device as claimed in claim 5, further comprising a first power driver for supplying a power of a first power supply of the first power driver, wherein the first power driver is configured to supply a low-level first power during the reset period and to supply a high-level first power during the threshold voltage compensation period, the scan period, and the emission period.

* * * * *